(12) United States Patent
Hirayama et al.

(10) Patent No.: US 12,441,899 B2
(45) Date of Patent: Oct. 14, 2025

(54) INK COMPOSITION FOR WATER-BASED BALLPOINT PEN

(71) Applicant: MITSUBISHI PENCIL COMPANY, LIMITED, Shinagawa-ku (JP)

(72) Inventors: Akiko Hirayama, Shinagawa-ku (JP); Kousuke Ogura, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 614 days.

(21) Appl. No.: 17/759,825

(22) PCT Filed: Jan. 30, 2020

(86) PCT No.: PCT/JP2020/003464
§ 371 (c)(1),
(2) Date: Jul. 29, 2022

(87) PCT Pub. No.: WO2021/152779
PCT Pub. Date: Aug. 5, 2021

(65) Prior Publication Data
US 2023/0073595 A1    Mar. 9, 2023

(51) Int. Cl.
*C09D 11/18* (2006.01)
*B43K 7/02* (2006.01)
*C09D 11/17* (2014.01)

(52) U.S. Cl.
CPC ............ *C09D 11/18* (2013.01); *B43K 7/02* (2013.01); *C09D 11/17* (2013.01)

(58) Field of Classification Search
None
See application file for complete search history.

(56) References Cited

U.S. PATENT DOCUMENTS

| 6,666,913 | B2 | 12/2003 | Hirano et al. |
| 7,208,036 | B2 | 4/2007 | Fukuo et al. |
| 7,371,785 | B2 | 5/2008 | Yoshimura et al. |

(Continued)

FOREIGN PATENT DOCUMENTS

| CN | 106752368 A | 5/2017 |
| EP | 1 411 094 A1 | 4/2004 |

(Continued)

OTHER PUBLICATIONS

C-800BK (black), Negami Chemical Industries, Nov. 5, 2020 (Year: 2020).*

(Continued)

*Primary Examiner* — Peter A Salamon
(74) *Attorney, Agent, or Firm* — Oblon, McClelland, Maier &Neustadt, L.L.P.

(57) ABSTRACT

An ink composition for a water-based ballpoint pen and a water-based ballpoint pen, which have stable ink flowability even in a so-called fine ballpoint pen, have excellent luster of drawn lines, and do not cause a ball to fall off. The ink composition for a water-based ballpoint pen according to the present invention contains at least an aluminum pigment and 8 to 25 mass % of solid urethane particles with an average particle size of 0.3 to 10 μm. In addition, a water-based ballpoint pen according to the present invention is provided with the ink composition for a water-based ballpoint pen that has the above composition.

17 Claims, 6 Drawing Sheets

(56) References Cited

U.S. PATENT DOCUMENTS

| | | | |
|---|---|---|---|
| 2003/0073595 A1* | 4/2003 | Dorton | C11D 7/5027 |
| | | | 510/505 |
| 2003/0089271 A1* | 5/2003 | Hirano | C09D 11/037 |
| | | | 106/404 |
| 2004/0173121 A1* | 9/2004 | Fukuo | B43K 8/02 |
| | | | 106/31.89 |
| 2005/0143486 A1* | 6/2005 | Yoshimura | C09D 11/18 |
| | | | 523/160 |
| 2006/0069183 A1* | 3/2006 | Kurihara | C09D 11/17 |
| | | | 523/160 |

FOREIGN PATENT DOCUMENTS

| | | | | |
|---|---|---|---|---|
| EP | 3211046 A1 * | 8/2017 | | B43K 7/00 |
| JP | 11-28887 A | 2/1999 | | |
| JP | 2003-34768 A | 2/2003 | | |
| JP | 2003-268285 A | 9/2003 | | |
| JP | 2004-26923 A | 1/2004 | | |
| JP | 2010-125841 A | 6/2010 | | |
| JP | 2014-129440 A | 7/2014 | | |
| JP | 2017-119862 A | 7/2017 | | |
| JP | 2017-155081 A | 9/2017 | | |
| JP | 2017-155162 A | 9/2017 | | |
| JP | 2020-23615 A | 2/2020 | | |

OTHER PUBLICATIONS

Extended European Search Report issued Aug. 29, 2023 in European Patent Application No. 20917032.3, 3 pages.

* cited by examiner

INK COMPOSITION FOR WATER-BASED BALLPOINT PEN

CROSS-REFERENCE TO RELATED APPLICATIONS

The present application is the national stage of international application PCT/JP2020/003464, filed on Jan. 30, 2020, claiming the benefit of the filing date thereof, the content of which is incorporated by reference.

TECHNICAL FIELD

The present invention relates to an ink composition for a water-based ballpoint pen containing an aluminum pigment.

BACKGROUND ART

In the related art, a water-based ballpoint pen using aluminum powder as a pigment provides drawn lines having a luster, but the performance of the water-based ballpoint pen is dependent on the size of the aluminum powder.

Large aluminum pigments produce a strong luster, but tends to make block in a gap in a chip.

In particular, in a case of a so-called fine ballpoint pen having a ball diameter of φ0.5 mm or less, since the gap becomes smaller, such an impasse is more likely to occur. Further, since the fine ballpoint pen has a small amount of ink flowed, there is an issue that it is difficult to obtain a luster.

Then, as an invention of a water-based ballpoint pen or the like to solve such issues, some instruments are known. For example, 1) a writing instrument such as ballpoint pens obtained by blending spherical resin particles such as an acrylic resin, a styrene/acrylic copolymer, and polyolefin to suppress aggregation of metal particles, for an example of which, refer to Patent Document 1, 2) a brilliant ink composition for a ballpoint pen obtained by blending microcapsule particles and the like to prevent bearings from wearing, and a ballpoint pen containing the same, for an example of which, refer to Patent Documents 2 and 3, and 3) a ballpoint pen that has a clearance within a predetermined range such that a ball of a ballpoint pen tip can move and rotate, for an example of which, refer to Patent Document 4.

However, even if the technical contents (inventions) of Patent Documents 1 to 4 are known, in the case of a so-called fine ballpoint pen having a ball diameter of φ0.5 mm or less, a sufficient effect has not yet been obtained. In addition, a ball retention force is smaller than that of a ballpoint pen having a ball diameter of more than φ0.5 mm, and the ball tends to fall off depending on usage conditions. Although it is possible to make up for it with designing the ballpoint pen tip, there may be adverse effects such as deterioration of writing quality and deterioration of ink flowability.

Furthermore, the retention of the ball is provided by caulking an end of a holder in which the ball is stored. However, a retention force decreases due to the wear of a caulked part due to writing or a local stress strain caused by a solid matter getting stuck between an inner surface of the caulked part and the ball, and thereby the ball may fall off due to an impact, making it impossible to write.

CITATION LIST

Patent Document

Patent Document 1: JP 2010-125841 A (Claims, Examples, and the like)
Patent Document 2: JP 2014-129440 A (Claims, Examples, and the like)
Patent Document 3: JP 2017-119862 A (Claims, Examples, and the like)
Patent Document 4: JP 11-28887 A (Claims, Examples, FIG. 1, and the like)

SUMMARY OF INVENTION

Technical Problem

In light of the above-described issues of the related art and the like, an object of the present invention is to solve this, and an object of the present invention is to provide an ink composition for a water-based ballpoint pen and a water-based ballpoint pen, which have stable ink flowability even in a so-called fine ballpoint pen, have excellent luster of drawn lines, and do not cause a ball to fall off.

Solution to Problem

As a result of dedicated research in light of the issues of the prior art described above, the present inventors have found that the intended ink composition for water-based ballpoint pens can be obtained by including at least a specific amount of an aluminum pigment and particles having specific physical properties with an average particle size in a predetermined range, and thus completed the present invention.

That is, the ink composition for a water-based ballpoint pen according to the present invention includes at least an aluminum pigment and 8 to 25 mass % of solid urethane particles with an average particle size of 0.3 to 10 μm.

In addition, a water-based ballpoint pen according to the present invention is provided with the ink composition for a water-based ballpoint pen that has the above composition.

In the present invention, a numerical range of the lower limit xx to the upper limit zz includes xx and zz.

Advantageous Effects of Invention

According to the present invention, there is provided an ink composition for a water-based ballpoint pen and a water-based ballpoint pen, which have stable ink flowability even in a so-called fine ballpoint pen, have excellent luster of drawn lines, and do not cause a ball to fall off.

DESCRIPTION OF EMBODIMENTS

Figure 1:
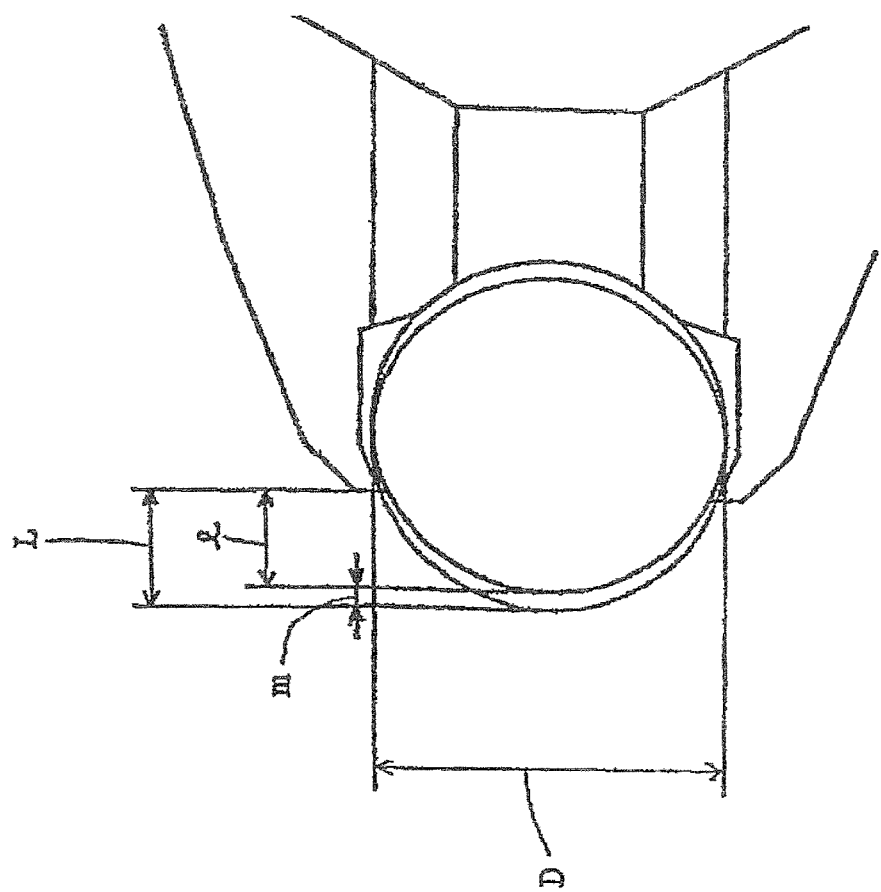
FIG. 1 is an enlarged vertical cross-sectional view of an example of a ballpoint pen tip of a water-based ballpoint pen on which an ink composition for a water-based ballpoint pen according to an embodiment of the present invention is mounted.

An embodiment of the present invention is described below in detail. The ink composition for a water-based ballpoint pen according to the present invention contains at least an aluminum pigment and 8 to 25 mass % of solid urethane particles with an average particle size of 0.3 to 10 µm.

Aluminum pigments that can be used in the present invention are generally produced by grinding or milling aluminum in a ball mill or an attritor mill in the presence of a grinding liquid medium using a grinding aid. As long as the aluminum pigments are used as pigments for water-based ink and the like, the manufacturing method, condition (powder form, paste form, and the like), particle size (average particle size, thickness), and the like are not particularly limited, and, for example, a commercially available product for water-based ink can be used.

Preferably, from the viewpoint of exerting better the effects of the present invention, particles having an average particle size of 20 µm or less are preferable, and particles having the average particle size of 5 to 16 µm are more preferable.

Examples of aluminum pigments that can be used include commercially available products such as WXM series in which an aluminum surface has been rust-proofed with a phosphorous-based compound, WL series in which an aluminum surface is rust-proofed with a molybdenum compound, EMR series in which an aluminum flake surface is coated with dense silica (all available from Toyo Aluminium K.K.), and SW-120 PM (available from Asahi Kasei Chemicals Corporation). These pigments may be used alone or as a mixture of two or more.

The content of these aluminum pigments is preferably 0.1 to 20 mass % (hereinafter, "mass %" is simply referred to as "%"), and more preferably 2 to 10%, relative to a total amount of the water-based ink composition for a writing instrument (hereinafter simply referred to as "ink composition total amount").

If the content of aluminum pigments is less than 0.1%, a luster cannot be obtained, whereas if the content exceeds 20%, writing feeling is impaired, and stability of the ink may be decreased.

The urethane particles used in the present invention are solid particles and have an average particle size of 0.3 µm to 10 µm. In the present invention, the term "solid" means not particles having voids (including single-void, multi-void, and porous) in particles such as hollow particles and microcapsule particles, but particles filled thoroughly without voids.

The average particle size of the urethane particles used is preferably 0.3 µm to 10 µm. The lower limit is preferably 0.5 µm or greater, more preferably 0.9 µm or greater, and particularly preferable 1.0 µm or greater. The upper limit is preferably 8 µm or smaller and more preferably 6 µm or smaller.

When the average particle size is less than 0.3 µm, the particles cover the surface of the aluminum pigment in the drawn line, which may impair the luster; and when the average particle size exceeds 10 µm, it is not preferable because stabilization of the dispersion of particles becomes difficult, and the inside of a tip tends to be clogged.

In the present invention, "average particle size" refers to the value of D50 calculated based on the volume in a laser diffraction method. Here, the measurement of average particle size by a laser diffraction method can be performed using, for example, a particle size distribution analyzer HRA 9320-X100 which is available from Nikkiso Co., Ltd.

In the present invention, as described above, it is important that the urethane particles to be used have a certain size (range of the average particle size) and are solid particles.

In the present invention, the use of solid particles makes it easier to control the strength of particles as compared with particles such as microcapsules.

The urethane particles to be used preferably have a 10% strength of 30 MPa or less as measured by a micro compression test. As a result, the urethane particles can be soft particles even if the particles are solid, and thus they do not cause the ball to fall off when the particles are stuck between a caulking and a ball. Also, when 10% strength is 5 MPa or more, the ink can be more stably flowed out.

Thus, by setting the 10% strength to 5 to 30 MPa, it is possible to highly achieve both good ink outflow stability and the characteristic of not causing the ball to fall off.

In the present invention, "micro compression test" can be performed using, for example, MCT-510, available from Shimadzu Corporation. In this case, it can be the average value of five particles.

This 10% strength can be calculated by the following equation:

$$C(x) = (2.48 \times P)/(\pi \times d^2)$$

C (x):10% strength/MPa
P: Test force at 10% displacement of particle size/N
d: Particle size/mm Any urethane particles may be used as long as the urethane particles are solid particles having the aforementioned average particle size. Furthermore, the urethane particles are particularly preferable as long as the 10% strength measured by the micro compression test has the above characteristics. They may be commercially available products or matters produced by a production method described below. Also, the urethane particles may be colored as long as the urethane particles have the characteristics described above.

When the urethane particles of the present invention are colored and used as a coloring material (colorant), the color development is higher than that of the microcapsule particles, and thus the amount of addition can be reduced. The microcapsule particles have a problem that the amount of coloring material that can be included is limited, and the shell inhibits color development.

In the present invention, the urethane particles that are colored function as a colorant to improve the degree of freedom of ink blending.

In addition, in the present invention, when the urethane particles are not colored, and other colorants are not contained in the ink composition, the hue of the ink composition becomes an aluminum pigment plus a non-colored urethane particle to give silver color (aluminum pigment+non-colored urethane particle).

The urethane particles used are polymers or copolymers having a urethane bond, and are obtained by reacting an isocyanate component (including a diisocyanate component) with a polyol component (including a diol component). Examples of the urethane particles used include at least one of urethane particles (such as polyester urethane particles, polycarbonate urethane particles, and polyether urethane particles) and urethane-urea particles. Preferably, the urethane particles used are obtained by the following production method.

The production of the urethane particles can be carried out by 1) preparing an oil phase containing an organic solvent, an isocyanate monomer or an isocyanate prepolymer, and, when coloring the urethane particles, a water-insoluble dye; 2) preparing an aqueous phase by mixing water and a dispersant; and 3) mixing the oil phase and the aqueous phase to emulsify components of the oil phase and then polymerizing.

The oil phase contains an organic solvent, an isocyanate monomer or an isocyanate prepolymer, and, when coloring the urethane particles, a water-insoluble dye. A plurality of the organic solvents may be included.

The oil phase can be prepared by: heating an organic solvent to a predetermined temperature while stirring and, when coloring the urethane particles, adding a water-insoluble dye; then, adding the aforementioned monomer or prepolymer and, optionally, another organic solvent.

Examples of the organic solvent include phenyl glycol, benzyl alcohol, ethylene glycol monobenzyl ether, and ethyl acetate. Additional examples include alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin.

Examples of the isocyanate monomer or prepolymer include hexamethylene diisocyanate, tolylene diisocyanate, diphenylmethane diisocyanate, xylylene diisocyanate, isophorone diisocyanate, and an isocyanate prepolymer.

From the perspective of curing favorably by polymerization, the isocyanate prepolymer is preferably a trimer such as a triol adduct or an isocyanurate-modified product of the isocyanate described above. In addition to the trimer described above, a dimer such as an allophanate-modified product of the isocyanate described above can be used as an auxiliary prepolymer.

In this method, the adjustment of the 10% of strength can be performed by, for example, the selection of the isocyanate component (a monomer or a prepolymer, an auxiliary monomer, an auxiliary prepolymer) and adjusting the content of the isocyanate component used. In addition, the average particle size of the urethane particles can be adjusted by controlling a stirring condition during the polymerization.

The water-insoluble dyes used in a case of coloring include dyes insoluble in water at room temperature, and the specific examples include a salt-forming dye, a disperse dye, or an oil-soluble dye. From the perspective of color development, the use of a salt-forming dye is preferable.

Examples of the salt-forming dye include a dye having an azo structure, a metal complex salt azo structure, an anthraquinone structure, or a metal phthalocyanine structure, such as Valifast (trade name) Black 1807, Valifast (trade name) Blue 2620, Valifast (trade name) Brown 2402, Valifast (trade name) Green 1501, Valifast (trade name) Orange 2210, Valifast (trade name) Pink 2310, Valifast (trade name) Red 1355, Valifast (trade name) VIOLET 1701, and Valifast (trade name) Yellow 1101, all available from Orient Chemical Industries Co., Ltd.

At least one dye selected from the following examples can be used as the disperse dye: C. I. Disperse Yellow 198, C. I. Disperse Yellow 42, C. I. Disperse Red 92, C. I. Disperse Violet 26, C. I. Disperse Violet 35, C. I. Disperse Blue 60, and C. I. Disperse Blue 87.

Examples of the oil-soluble dye include Oil Black 860, Oil Blue 613, Oil Brown BB, Oil Green 530, Oil Orange 201, Oil Pink 312, Oil Red 5B, Oil Scarlet 318, and Oil Yellow 105, all available from Orient Chemical Industries Co., Ltd.

The water phase can be prepared by mixing water and a dispersant. Examples of the dispersant include, but not limited to, polyvinyl alcohol.

The emulsification and polymerization step, that is, emulsifying the components of the oil phase and then polymerizing, can be performed by introducing the oil phase into the aqueous phase and subjecting the mixture to emulsification mixing using a homogenizer or the like under heating to a predetermined temperature; this results in colored urethane particles or uncolored urethane particles.

Furthermore, in addition to the emulsification and polymerization described above, the urethane particles may be produced by a phase separation method. The phase separation method includes: preparing a dye-containing solution when coloring the urethane particles, preparing a solution containing a protective colloid agent, and polymerizing an isocyanate monomer or isocyanate.

The dye-containing solution can be prepared by dissolving a water-insoluble dye in an organic solvent under heating. An organic solvent used in the emulsification and polymerization described above can be used as the water-insoluble dye and the organic solvent.

The protective colloid agent-containing solution can be prepared by dissolving a protective colloid agent in water. Examples of the protective colloid agent include a methyl vinyl ether-maleic anhydride copolymer.

Polymerization of the isocyanate monomer or isocyanate prepolymer can be performed by, when coloring the urethane particles, dispersing a dye-containing solution in the form of oil droplets in a protective colloid agent-containing solution that has been heated to a predetermined temperature, adding the aforementioned isocyanate monomer or isocyanate prepolymer to the dispersion, and stirring while maintaining the temperature.

These solid urethane particles can be used alone or as a mixture of two or more types. The content of such urethane particles is 8 to 25% and preferably 10 to 18%, based on the total amount of the ink composition.

When the content of solid urethane particles is less than 8%, the effect of the present invention cannot be exhibited; and, when the content of urethane particles having this characteristic is more than 25%, stability of the ink decreases. Thus, both cases are not preferable.

The ink composition for a water-based ballpoint pen according to the present invention contains at least the aluminum pigment and 8 to 25 mass % of solid urethane particles having an average particle size of 0.3 to 10 μm. In addition to these components, the ink composition for a water-based ballpoint pen according to the present invention may further contain, for example, an another coloring material such as pigment or dye, a water-soluble organic solvent, and, as a balance, water (such as tap water, purified water, distilled water, ion-exchanged water, or pure water) which is a solvent, and furthermore, optionally, various components which are commonly used in a water-based ink composition for a writing instrument, such as a thickener, a lubricant, a corrosion inhibitor, a preservative or antibacterial agent, or a pH modifier, in an appropriate amount within a range that does not impair the effect of the present invention.

In the present invention, in addition to the aluminum pigments and urethane particles when colored, an another coloring material (colorant) such as pigment or dye can be used as a complementary color component, if necessary.

Examples of the coloring material that can be used, in an appropriate amount within a range that does not impair the effect of the present invention, include a dye that is dissolved or dispersed in water, a known inorganic pigment such as titanium oxide and an organic pigment, a pigment in which a base material, such as silica or mica, is coated on the surface layer with iron oxide, titanium oxide or the like in multiple layers.

Examples of the dye include an acid dye such as Eosin, Phloxine, Water Yellow #6-C, Acid Red, Water Blue #105, Brilliant Blue FCF, Nigrosine NB; a direct dye such as Direct Black 154, Direct Sky Blue 5B, Violet B00B; and a basic dye such as rhodamine and methyl violet.

Examples of the organic pigment include azo lake, an insoluble azo pigment, a chelate azo pigment, a phthalocyanine pigment, a perylene and perinone pigment, and a nitroso pigment. Specific examples include: inorganic pigments, such as carbon black, titanium black, zinc oxide, colcothar, chromium oxide, iron black, cobalt blue, iron oxide yellow, viridian, zinc sulfide, lithopone, cadmium yellow, vermilion, cadmium red, chrome yellow, molybdate orange, zinc chromate, strontium chromate, white carbon, clay, talc, ultramarine blue, precipitated barium sulfate, barite powder, calcium carbonate, white lead, dark blue, prussian blue, manganese violet, and brass powder; and organic pigments, such as C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 95, C. I. Pigment Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

These coloring materials may be used alone or in a combination of two or more.

Examples of the water-soluble organic solvent that can be used include: glycols such as ethylene glycol, diethylene glycol, triethylene glycol, propylene glycol, polyethylene glycol, 3-butylene glycol, thiodiethylene glycol, and glycerin; ethylene glycol monomethyl ether; and diethylene glycol monomethyl ether. These water-soluble organic solvents may be used alone or as a mixture of two or more.

The content of these water-soluble organic solvents is adjusted as appropriate depending on the application of the water-based ink composition for a writing instrument and is in a range of 1% to 30% relative to the total amount of the ink composition.

As the thickener that can be used, for example, at least one selected from the group consisting of synthetic polymers, cellulose, and polysaccharides is preferred. Specific examples thereof include arabic gum, tragacanth gum, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, starch glycolic acid and salts thereof, polyvinylpyrrolidone, polyvinyl methyl ether, polyacrylic acid and salts thereof, polyethylene oxide, copolymers of vinyl acetate and polyvinylpyrrolidone, and styrene-acrylic acid copolymers and salts thereof.

Examples of the lubricant include non-ionic types such as fatty acid esters of polyhydric alcohols, higher fatty acid esters of saccharides, and polyoxyalkylene higher fatty acid esters, anionic types such as phosphates, alkyl sulfonates of higher fatty acid amides, and alkyl allyl sulfonates, derivatives of polyalkylene glycols, fluorochemical surfactants, and polyether modified silicones; these can also be used as surface treatment agents for pigments.

Examples of the corrosion inhibitor include benzotriazol, tolyltriazole, dicycloheptaerythrityl, and saponins. Examples of the preservative or antifungal agent include and phenol, omadine sodium, sodium benzoate, benzoisothiazolin, and benzimidazole compounds.

Examples of the pH modifier include hydroxides of alkali metals such as sodium hydroxide, potassium hydroxide, and lithium hydroxide; amine compounds such as triethanolamine, diethanolamine, monoethanolamine, dimethylethanolamine, morpholine, and triethylamine; and ammonia.

The ink composition for a water-based ballpoint pen according to the present invention can be prepared by combining at least an aluminum pigment and 8 to 25 mass % of solid urethane particles with an average particle size of 0.3 to 10 µm with another component as appropriate depending on, for example, the ballpoint pen structure, stirring and mixing using a stirrer such as a homomixer, a homogenizer, or a disperser, and optionally, filtering or centrifuging the mixture to remove coarse particles in the ink composition.

The resulting ink composition for a water-based ballpoint pen according to the present invention is used in a ballpoint pen provided with a ballpoint pen tip.

The reason for that the ink composition for a water-based ballpoint pen of the present invention configured as described above corresponds to an ink composition for a water-based ballpoint pen, which has stable ink flowability even if it is a so-called fine ballpoint pen having a ball diameter of φ0.5 mm or less, and has an excellent luster of drawn lines and does not cause the ball to fall off, is presumed as follows.

The ink composition for a water-based ballpoint pen of the present invention includes at least an aluminum pigment and 8 to 25%5 of urethane particles having an average particle size of 0.3 to 10 µm. By containing 8 to 25% of these urethane particles, it is presumed that it suppresses the aggregation of aluminum pigments, and even if urethane particles get stuck between the inner surface of the caulked part and the ball, local stress strain does not occur and the ball retention force does not decrease. Thereby, it is possible to obtain an ink composition for a water-based ballpoint pen, which has stable ink flowability, excellent luster of drawn lines, and does not cause the ball to fall off.

A water-based ballpoint pen according to the present invention includes, for example, an instrument where an ink composition for a water-based ballpoint pen having the aforementioned composition is accommodated in an ink container (refill) for a ballpoint pen, and where a material is accommodated as an ink follower, the material being not compatible with the water-based ink composition accommodated in the ink container while having a small specific gravity with respect to the water-based ink composition, such as at least one among polybutene, silicone oil, and mineral oil.

The structure of the ballpoint pen is not limited, and the water-based ballpoint pen may be, for example, a direct liquid type ballpoint pen provided with a collector structure (ink retention mechanism) using a barrel itself as an ink container in which the barrel is filled with the ink composition for water-based ballpoint pens having the composition described above.

In the water-based ballpoint pen of the present invention, preferably, when the ball diameter in the water-based ballpoint pen is set as D and the maximum ball exposure is set as L, as illustrated in FIG. 1, the value of X represented by Equation (I) below is preferably 27 to 37, and more preferably 28 to 36.

$$X=(L/D6)\times 100 \quad (I)$$

D: Ball diameter, L: Maximum ball exposure, L=(ball exposure l+clearance m)

More preferably, it is desirable to have a ball having a value of X represented by the above Equation (I) and having a ball diameter ($\varphi$) of 0.5 mm or less, more preferably 0.3 mm or less, and particularly preferably 0.29 mm or less.

By providing the water-based ballpoint pen having this structure, it is possible to obtain a water-based ballpoint pen that exhibits further ball jumping-out resistance and further excellent writing feeling in combination with the ink composition for a water-based ballpoint pen having the above characteristics.

In the water-based ballpoint pen of the present invention, a specific form of a water-based ballpoint pen including a ballpoint pen tip of the above characteristics includes the water-based ballpoint pen of FIGS. 2 to 6.

Figure 2:
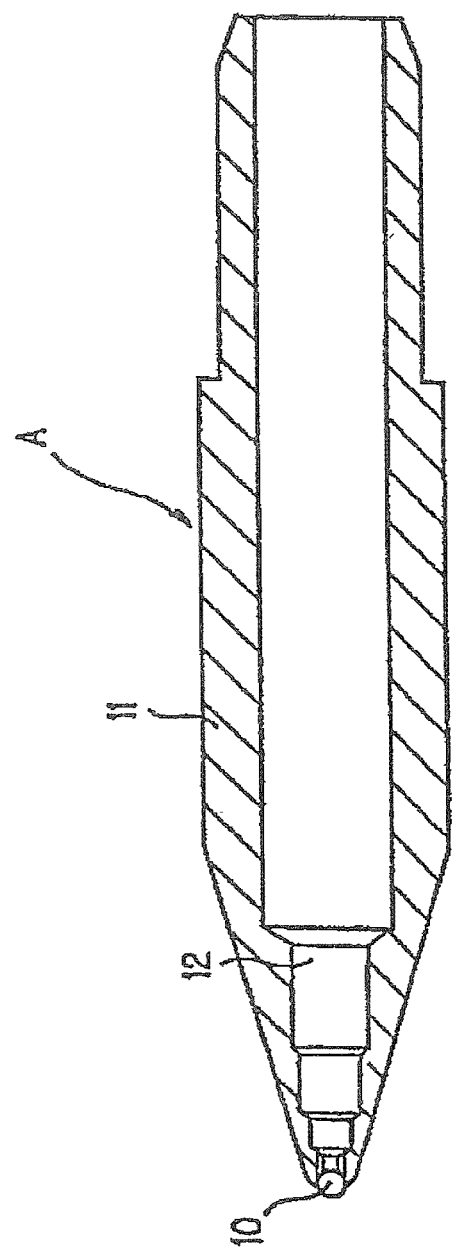
FIG. 2 is a longitudinal cross-sectional view illustrating the ballpoint pen tip of FIG. 1.
Figure 3:
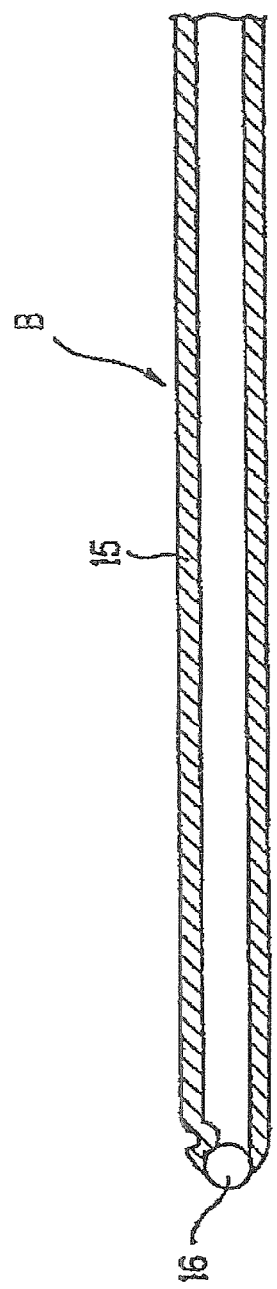
FIG. 3 is a vertical cross-sectional view illustrating another example of a ballpoint pen tip.
Figure 4:
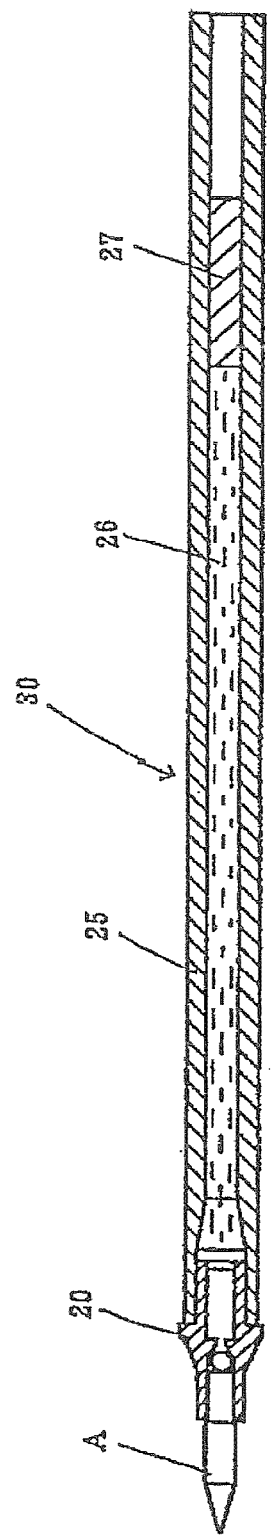
FIG. 4 is a vertical cross-sectional view illustrating a state in which the ballpoint pen tip of FIG. 2 is attached to an ink housing tube (refill).
Figure 5:
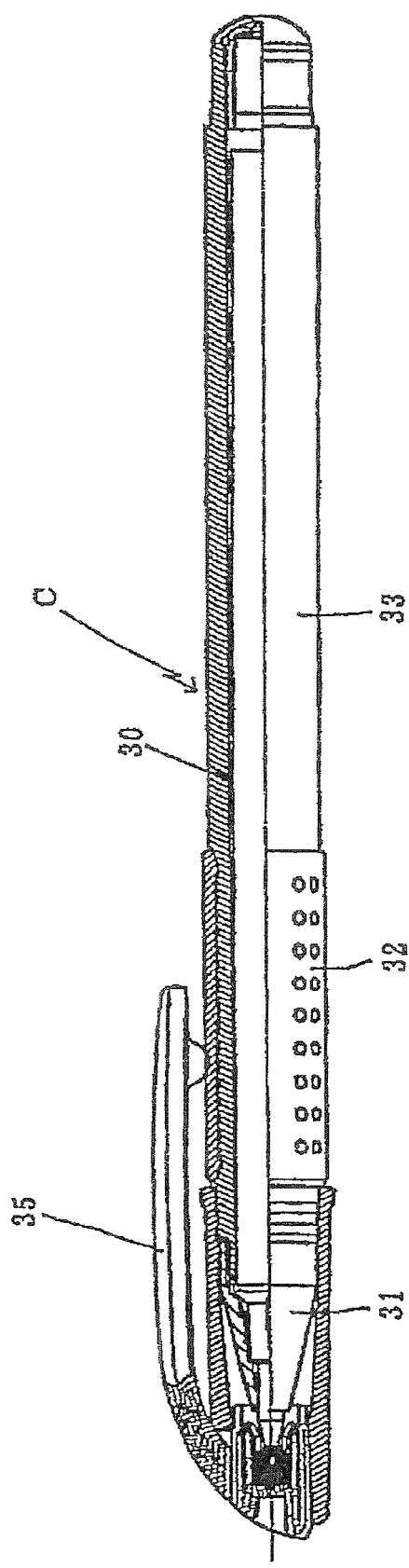
FIG. 5 illustrates an example of an embodiment of the water-based ballpoint pen of the present invention, and is a vertical cross-sectional view illustrating a state in which the ink housing tube (refill) of FIG. 4 is attached to a shaft body to form a water-based ballpoint pen.
Figure 6:
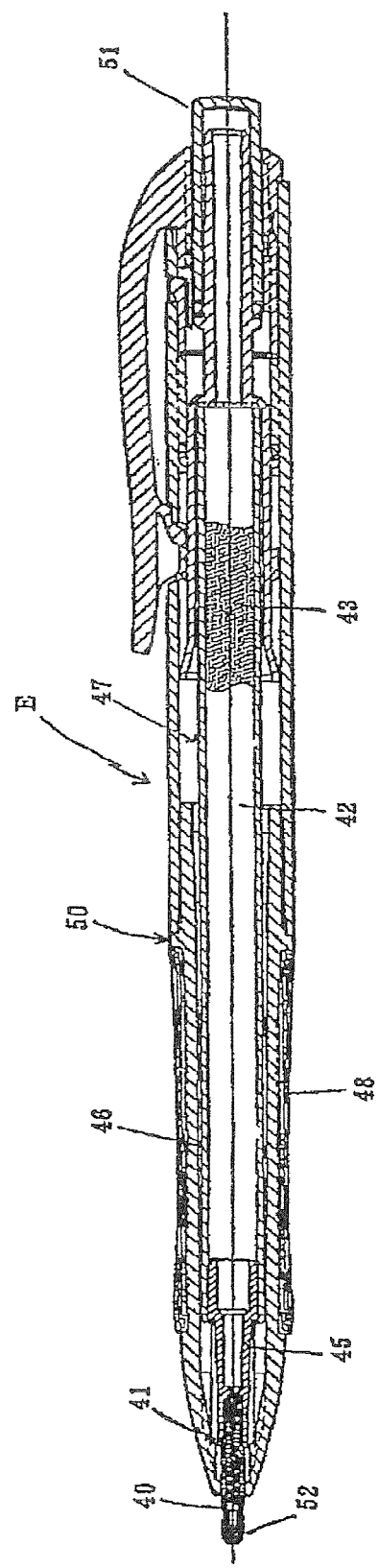
FIG. 6 illustrates another example of the embodiment of the water-based ballpoint pen of the present invention, and is a vertical cross-sectional view illustrating a knock-type water-based ballpoint pen in which the ink housing tube (refill) of FIG. 4 is attached to a knock-type shaft body.

FIG. 2 illustrates an example of a ballpoint pen tip having a ball having a ball diameter ($\varphi$) of 0.5 mm or less, more preferably 0.3 mm or less, and particularly preferably 0.29 mm or less, FIG. 3 illustrates another example of the ballpoint pen tip of FIG. 2, FIG. 4 is a drawing illustrating a state in which the ballpoint pen tip of FIG. 2 is attached to an ink housing tube (refill), FIG. 5 is a drawing illustrating a state in which an ink housing tube (refill) having the ballpoint pen tip of FIG. 4 is attached to a shaft body to form a water-based ballpoint pen, and FIG. 6 is a drawing illustrating another example (knock-type water-based ballpoint pen body) of the water-based ballpoint pen of FIG. 5.

FIG. 2 is a tapered ballpoint pen tip A provided with a hollow holder 11 having a tapered tip end side and rotatably retention a ball 10 having a ball diameter of, for example, 0.29 mm or less at the tip end portion. A water-based ballpoint pen C having this ballpoint pen tip A is obtained by connecting the rear end side of the ballpoint pen tip A to the ink housing tube 25 (directly or) via a joint member 20 having a backflow prevention mechanism to form a refill 30, for example, as illustrated in FIG. 4, and housing the refill 30 in a shaft body 33 having a slip-resistant member 32, as illustrated in FIG. 5, for example. Note that a mouthpiece 31 is fixed to the tip end of the shaft body 33. In addition, reference numeral 26 illustrated in FIG. 4 is the ink composition for a water-based ballpoint pen of the present invention described above, reference numeral 27 is the ink follower, and reference numeral 35 illustrated in FIG. 5 is a cap. In the water-based ballpoint pen C, the ink composition 26 for a water-based ballpoint pen of the present invention filled in the ink housing tube 25 is supplied to the ball 10 via an ink flow path 12 that is sequentially tapered.

FIG. 3 is a needle-type ball tip B in which the tip end of a thin tube 15 made of metal or the like is caulked inward to rotatably hold a ball 16 having a diameter (ball diameter) of 0.29 mm or less. The ballpoint pen tip B also includes a water-based ballpoint pen that is connected to an ink housing tube and a shaft body (not shown), similarly to the above.

FIG. 6 is a vertical cross-sectional view illustrating an example of a knock-type water-based ballpoint pen body in which an ink housing tube (refill) having the ballpoint pen tip of FIG. 2 is attached to a knock-type shaft body.

This knock-type water-based ballpoint pen body E includes the ballpoint pen tip 40 of FIG. 2, and the tip 40 is housed in a knock-type shaft body 50 including a slip-resistant member 48 with a refill 47 connected to the ink housing tube 46 via a joint member 45 having a backflow prevention mechanism. Note that reference numeral 41 illustrated in the drawing is a coil spring member housed in a tip and having a fine wire-shaped tip end, and the tip end portion urges the ball outward by the elastic force of the coil spring. Reference numeral 42 illustrated in the drawing is an ink composition for a water-based ballpoint pen of the present invention, reference numeral 43 is an ink follower having the above characteristics, reference numeral 51 is a knock portion, and reference numeral 52 is a coating member that protects a tip end portion.

The ball material is not particularly limited as long as the ball has a ball diameter ($\varphi$) of 0.5 mm or less, more preferably 0.3 mm or less, and particularly preferably 0.29 mm or less. Examples thereof include those made of metal members such as cemented carbide, those made of ceramic members, and those having a thin film coating member on the surface thereof to improve durability and corrosion resistance. The lower limit of the ball diameter is about 0.1 mm from the viewpoint of producing technology and the like.

Examples of the holder material include nickel silver, brass, stainless metal, and a synthetic resin.

The ink housing tube may be made of a transparent or translucent synthetic resin capable of checking the remaining amount of ink, or may be made of metal.

Incidentally, the water-based ballpoint pen of the present invention is not limited to the structure of the ballpoint pen tip of FIGS. 2 and 3, and the structure of the water-based ballpoint pen body including the ballpoint pen tip is not particularly limited as long as a ballpoint pen tip having a ball with a ball diameter ($\varphi$) of 0.5 mm or less, more preferably 0.3 mm or less, and particularly preferably 0.29 mm or less is used, and can be applied to, for example, water-based ballpoint pens having various structures including a knock-type. Furthermore, the material, size (inner diameter, length), and the like of a ball holder, an ink housing tube, a joint member (front barrel), and the like are set as appropriate depending on the tip structure, the ball diameter, the ink follower, and the like.

In the water-based ballpoint pen of the present invention configured as described above, even in a water-based ballpoint pen equipped with a ballpoint pen tip having a ball with a ball diameter ($\varphi$) of 0.5 mm or less, more preferably 0.3 mm or less, and particularly preferably 0.29 mm or less, by using the ink composition for a water-based ballpoint pen of the present invention, the water-based ballpoint pen has stable ink flowability, an excellent luster of drawn lines, and does not cause the ball to fall off.

In particular, in the water-based ballpoint pen of the present invention, as illustrated in FIG. 1, when the ball diameter of the water-based ballpoint pen is set as D and the maximum ball ejection dimension is set as L, by using a ballpoint pen tip having a value of X represented by the above Equation (I) of 27 to 37, it is possible to obtain a water-based ballpoint pen that has stable ink flowability, an excellent luster of drawn lines, and does not cause the ball to fall off, and that exhibits ball jumping-out resistance and further excellent writing feeling in combination with in combination with the ink composition for a water-based ballpoint pen of the present invention. In this water-based ballpoint pen, the smaller the ball diameter (φ), the more the effect of the present invention can be exhibited, and it can be suitably used for a water-based ballpoint pen having a ball with a ball diameter of 0.5 mm or less, more preferably 0.3 ram or less, and particularly preferably 0.29 mm or less.

Example 1

Next, the present invention will be described in more detail with respect to Production Example (preparation of urethane particles or the like), Examples and Comparative Examples (preparation of ink composition for water-based ballpoint pen), but the present invention is not limited to the following Examples.

<Preparation of Urethane Particles A to F and Melamine Particles G>

Urethane particles A to F and melamine particles G were prepared by the compounding composition shown in Table 1 below, and the following methods.

Production Example 1: Urethane Particles A

While heating 12.5 parts by mass of ethyl acetate as an organic solvent to 60° C., 8 parts by mass of an isocyanurate-modified product of hexamethylene diisocyanate as a prepolymer (TLA-100, available from Asahi Kasei Chemicals Corporation) was added thereto to prepare an oil phase solution. While 200 parts by mass of distilled water was heated to 60° C., 15 parts by mass of polyvinyl alcohol (PVA-205, available from Kuraray Co., Ltd.) as a dispersing agent was dissolved therein, and a water-based phase solution was prepared. Then, the oil phase solution was added to the water phase solution at 60° C., and stirred with a homogenizer for 6 hours for emulsion polymerization, thus completing polymerization. By subjecting the obtained dispersion to centrifugation, urethane particles (uncolored) A were obtained.

Production Example 2: Urethane Particles B

While 11.5 parts by mass of ethylene glycol monobenzyl ether as an organic solvent were heated to 60° C., 7.2 parts by mass of trimethylolpropane (1 mol) adduct of diphenylmethane diisocyanate (3 mol) (D-109, available from Mitsui Chemicals, Inc.) as a prepolymer was added thereto, and an oil phase solution was prepared. While 200 parts by mass of distilled water was heated to 60° C., 15 parts by mass of polyvinyl alcohol (PVA-205, available from Kuraray Co., Ltd.) as a dispersing agent was dissolved therein, and a water-based phase solution was prepared. The oil phase solution was added to the water phase solution at 60° C., and stirred with a homogenizer for 6 hours for emulsion polymerization, thus completing polymerization. By subjecting the obtained dispersion to centrifugation, urethane particles (red particles) B were obtained.

Production Example 3: Urethane Particles C

Urethane particles (blue particles) were obtained in the same manner as the urethane particles B except that 2.8 parts by mass of water-insoluble dye (Valifast Red 1355, available from Orient Chemical Industries Co., Ltd) was changed to 2.4 parts by mass of water-insoluble dye (Valifast Blue 2620, available from Orient Chemical Industries Co., Ltd), 11.5 parts by mass of ethylene glycol monobenzyl ether was changed to 9.6 parts by mass of benzyl alcohol, and 7.2 parts by mass of trimethylolpropane (1 mol) adduct (D-109, available from Mitsui Chemicals, Inc.) of diphenylmethane diisocyanate (3 mol) was changed to 7 parts by mass of an allophanate modified product of hexamethylene diisocyanate (D-178NL, available from Mitsui Chemicals, Inc.).

Production Example 4: Urethane Particles D

Urethane particles (not colored) D were obtained in the same manner as the urethane particles A except that 8 parts by mass of an isocyanurate-modified product of hexamethylene diisocyanate as a prepolymer (TLA-100, available from Asahi Kasei Chemicals Corporation) was changed to 15 parts by mass.

Production Example 5: Urethane Particles E

In Production Example 2, urethane particles (red particles) E having different average particle sizes were obtained by changing the stirring conditions during polymerization.

Production Example 6: Urethane Particles F

In Production Example 3, urethane particles (blue particles) F having different average particle sizes were obtained by changing the stirring conditions during polymerization.

Production Example 7: Melamine Particles G

Melamine particles (not colored) G were obtained in the same manner as the urethane particles A except that 12.5 parts by mass of ethyl acetate was changed to 20 parts by mass of benzyl alcohol, 8 parts by mass of an isocyanurate-modified product of hexamethylene diisocyanate as a prepolymer (TLA-100, available from Asahi Kasei Chemicals Corporation) was changed to 7 parts by mass of methylol melamine.

The 10% strength (MPa) and the average particle size (μm) of the obtained urethane particles A to F and melamine particles G were measured by the following methods. These results are shown in Table 1 below.

(Method for Measuring 10% Strength)

Calculation was performed according to the above equation using MCT-510 available from Shimadzu Corporation.

(Method for Measuring Average Particle Size)

The average particle size was measured using a particle size distribution analyzer HRA 9320-X100 available from Nikkiso Co., Ltd.

<Preparation of Ink Composition for Water-Based Ballpoint Pen>

Examples 1 to 8 and Comparative Examples 1 to 3

An ink composition for a water-based ballpoint pen was prepared by a known method according to the blending composition (total amount: 100 mass %) shown in the following Table 2.

The obtained water-based ink compositions for a writing instrument (total 100 mass %) were evaluated for ink flowability (drawn line evaluation, ink flow rate), and ball retention using a water-based ballpoint pen having the following composition according to the following evaluation method.

These results are indicated in Table 2 below.
<Preparation of Water-Based Ballpoint Pen>

Each of the ink compositions for a water-based ballpoint pen of Examples 1 to 8 and Comparative Examples 1 to 3 was filled into a refill made of a polypropylene ink housing tube (having an inner diameter of 4 mm and a length of 113 mm), a stainless steel tip (having a cemented carbide ball with a ball diameter of 0.38 mm) according to FIGS. 1 and 2, and a joint connecting the containing tube and the tip. The rear end of the ink was then loaded with an ink follower made of mineral oil, polybutene, and an olefin elastomer. Each of the refills was incorporated in a barrel of a ballpoint pen (UM-151, available from Mitsubishi Pencil Co., Ltd.) to prepare a water-based ballpoint pen.

When the ball diameter D (0.38 mm) and the maximum ball output dimension L of the water-based ballpoint pen used in the examples and comparative examples were taken, the value of X represented by the above Equation (I) was in the range of 27 to 37.

[Ink Flowability (Drawn Line Evaluation, Ink Flow Rate)]

Writing was performed with a φ0.38 mm ballpoint pen until all the ink was consumed (in accordance with JIS S6061), and the drawn line evaluation and the state of the ink flow rate at every 100 m were evaluated according to the following evaluation criteria (A to C).

<Evaluation Criteria for Drawn Line Evaluation>
A: Luster is sufficient
B: Luster is slightly weak
C: Luster is insufficient <Evaluation Criteria of Ink Flow Rate>
A: Constant flow rate was maintained until end
B: Flow rate decreased slightly in latter half
C: Writing was impossible or an extreme decrease in flow rate occurred on the way

[Ball Retention]

After writing up to 200 m with the same ballpoint pen as described above, the pen was dropped from a height of 1.8 m with the pen tip facing upward, and evaluation was performed according to the following evaluation criteria (A, C). n=50

<Evaluation Criteria for Ball Retention>
A: All the ballpoint pens retained balls.
C: Some ballpoint pens let balls fall off.

TABLE 1

| Production Examples 1 to 7 | | A | B | C | D | E | F | G |
|---|---|---|---|---|---|---|---|---|
| Dye (parts by mass) | Blue: ValifastBlue 2620 (Orient Chemical Industries Co., Ltd.) | | | 2.4 | | | 2.4 | |
| | Red: ValidastRed 1355 (Orient Chemical Industries Co., Ltd.) | | 2.8 | | | 2.8 | | |
| Solvent (parts by mass) | Ethyl acetate | 12.5 | | | 12.5 | | | |
| | Benzyl alcohol | | | 9.6 | | | 9.6 | 20 |
| | Ethylene glycol monobenzyl ether Phenyl glycol | | 11.5 | | | 11.5 | | |
| Polymer component (parts by mass) | Hexamethylene diisocyanate isocyanurate modified product | 8 | | | 15 | | | |
| | Trimethylolpropane (1 mol) adduct of diphenylmethane diisocyanate (3 mol) | | 7.2 | | | 7.2 | | |
| | Hexamethylene diisocyanate allophanate-modified product | | | 7 | | | 7 | |
| | Methylol melamine | | | | | | | 7 |
| | 10% strength (MPa) | 12.8 | 18.4 | 9.4 | 32.1 | 22.2 | 6.2 | 12.8 |
| | Average particle size (μm) | 1.2 | 2.1 | 1.4 | 1.3 | 0.3 | 8.8 | 1.1 |

TABLE 2

(Total amount: 100 mass %)

| | | | Examples | | | | | | | | Comparative Examples | | |
|---|---|---|---|---|---|---|---|---|---|---|---|---|---|
| | | | 1 | 2 | 3 | 4 | 5 | 6 | 7 | 8 | 1 | 2 | 3 |
| Resin particles (Table 1 and the other) | Urethane Particles A | | 14 | | | 8 | 25 | | | | | | |
| | Urethane Particles B | | | 12 | | | | | | | | | |
| | Urethane Particles C | | | | 15 | | | | | | | | |
| | Urethane Particles D | | | | | | | 14 | | | | | |
| | Urethane Particles E | | | | | | | | 12 | | | | |
| | Urethane Particles F | | | | | | | | | 15 | | | |
| | Melamine particles G | | | | | | | | | | | 14 | |
| | Acrylic particles | 1 | | | | | | | | | | | 14 |
| Aluminum powder pigment | Aluminum powder pigment A | 2 | 8 | | 10 | 8 | 8 | 8 | | 10 | 8 | | 8 |
| | Aluminum powder pigment B | 3 | | 6 | | | | | 6 | | | 8 | |
| Corrosion inhibitor | Benzotriazol | | 0.3 | 0.3 | 0.3 | 0.3 | 0.3 | 0.3 | 0.3 | 0.3 | 0.3 | 0.3 | 0.3 |
| pH modifier | Triethanlamine | | 0.5 | 0.5 | 0.5 | 0.5 | 0.5 | 0.5 | 0.5 | 0.5 | 0.5 | 0.5 | 0.5 |
| Lubricant | Phosphate | 4 | 0.4 | 0.4 | 0.4 | 0.4 | 0.4 | 0.4 | 0.4 | 0.4 | 0.4 | 0.4 | 0.4 |
| Thickener | Xanthan gum | 5 | 0.28 | 0.28 | 0.28 | 0.28 | 0.28 | 0.28 | 0.28 | 0.28 | 0.28 | 0.28 | 0.28 |
| Solvent | Glycerin | | 6 | 6 | 6 | 6 | 6 | 6 | 6 | 6 | 6 | 6 | 6 |

TABLE 2-continued (Total amount: 100 mass %)

|  |  | Examples | | | | | | | | Comparative Examples | | |
|---|---|---|---|---|---|---|---|---|---|---|---|---|
|  |  | 1 | 2 | 3 | 4 | 5 | 6 | 7 | 8 | 1 | 2 | 3 |
| Water | Distilled water | 70.52 | 74.52 | 67.52 | 76.52 | 59.52 | 70.52 | 74.52 | 67.52 | 84.52 | 70.52 | 70.52 |
| Ink flowability evaluation | Drawn line evaluation | A | A | A | A | B | A | A | B | B | B | B |
|  | Ink flow rate | A | A | A | B | A | B | B | B | C | B | B |
| Ball retention |  | A | A | A | A | A | A | A | A | C | C | C |

Annotations 1 to 5 in Table 2 above are as follows:
1: J-4 PM, average particle size 2.4 µm, 10% strength 33 MPa, PMMA, available from Negami Chemical Industrial Co., Ltd.
2: EMERAL EMR-D7675, average particle size 16 µm, silica coating, available from Toyo Aluminium K.K.
3: EMERAL EMR-D5680, average particle size of 8 µm, silica coating, available from Toyo Aluminium K.K.
4: RD-510Y, available from Toho Chemical Industry Co., Ltd.
5: KELSAN AR, available from Sansho Co., Ltd.

To discuss the results shown in Tables 1 and 2 above, it was found that the ink flowability (drawn line evaluation, ink flow rate), and ball retention in Examples 1 to 8 falling in the scope of the present invention were superior to those in Comparative Examples 1 to 3 outside the scope of the present invention.

Specifically, in Examples 1 and 4 to 6, uncolored urethane particles were used together with the aluminum pigment, and it was checked that they were superior in ink flowability (drawn line evaluation, ink flow rate), and ball retention, as compared with Comparative Examples 1 to 3 comprising aluminum pigments only, aluminum pigment plus melamine particles or acrylic particles.

In addition, it was checked that Examples 2, 3, 7, and 8 using colored urethane particles (Blue, Red) together with the aluminum pigments were also excellent in ink flowability (drawn line evaluation, ink flow rate), and ball retention as well as excellent color developability.

INDUSTRIAL APPLICABILITY

An ink composition for a water-based ballpoint pen suitable for ballpoint pens is obtained.

REFERENCE SIGNS LIST

A Ballpoint pen tip
C Ballpoint pen
10 Ball
30 Refill

The invention claimed is:

1. A water-based ballpoint pen, comprising:
a ballpoint pen tip having a ball with a ball diameter of 0.5 mm or less; and
an ink composition suitable for a water-based ballpoint pen,
wherein the ink composition comprises an aluminum pigment, having an average particle size in a range of from 5 to 20 µm, in a range of from 0.1 to 20 mass % and solid urethane particles, having an average particle size in a range of from 0.3 to 10 µm, in a range of from 8 to 25 mass %.

2. The water-based ballpoint pen of claim 1, wherein the ink composition comprises the solid urethane particles in a range of from 10 to 18 mass %, and
wherein the solid urethane particles have an average particle size in a range of from 0.5 to 8 µm.

3. The water-based ballpoint pen of claim 1, wherein the urethane particles have a 10% strength of 30 MPa or less, calculated by equation (II), as measured by a micro compression test:

$$C(x) = (2.48 \times P)/(\pi \times d^2) \tag{II}$$

wherein $C(x)$ is 10% strength in MPa, P is a test force at 10% displacement of particle size in N, and d is particle size in mm.

4. The water-based ballpoint pen of claim 1, wherein the urethane particles are not colored.

5. The water-based ballpoint pen of claim 1, wherein the solid urethane particles have an average particle size in a range of from 1 to 6 µm.

6. The water-based ballpoint pen of claim 2, wherein the solid urethane particles have an average particle size in a range of from 1 to 6 µm.

7. The water-based ballpoint pen of claim 1, wherein the solid urethane particles comprise, in polymerized form, hexamethylene diisocyanate, tolylene diisocyanate, diphenylmethane diisocyanate, xylylene diisocyanate, isophorone diisocyanate, and/or an isocyanate prepolymer.

8. The water-based ballpoint pen of claim 1, wherein the solid urethane particles comprise, in polymerized form, a triol adduct of hexamethylene diisocyanate, tolylene diisocyanate, diphenylmethane diisocyanate, xylylene diisocyanate, and/or isophorone diisocyanate.

9. The water-based ballpoint pen of claim 1, wherein the solid urethane particles comprise, in polymerized form, an isocyanurate-modified product of hexamethylene diisocyanate, tolylene diisocyanate, diphenylmethane diisocyanate, xylylene diisocyanate, and/or isophorone diisocyanate.

10. The water-based ballpoint pen of claim 1, wherein the ball diameter of the ball is 0.3 mm or less.

11. The water-based ballpoint pen of claim 1, wherein the ball diameter of the ball is 0.29 mm or less.

12. The water-based ballpoint pen of claim 1, wherein the ball diameter of the ball is in a range of from 0.1 to 0.5 mm.

13. The water-based ballpoint pen of claim 1, wherein the ball diameter of the ball is in a range of from 0.1 to 0.3 mm.

14. The water-based ballpoint pen of claim 1, wherein the ball diameter of the ball is in a range of from 0.1 to 0.29 mm.

15. The water-based ballpoint pen of claim 1, wherein the solid urethane particles comprise, in polymerized form, an adduct of hexamethylene diisocyanate, tolylene diisocyanate, diphenylmethane diisocyanate, xylylene diisocyanate, and/or isophorone diisocyanate with trimethylolpropane.

16. The water-based ballpoint pen of claim 3, wherein the urethane particles have a 10% strength in a range of from 5 to 30 MPa.

17. The water-based ballpoint pen of claim 1, wherein the value of X calculated by equation (I) is in a range of from 27 to 37:

$$X = (L/D) \times 100 \tag{I}$$

wherein B is ball diameter, and L is maximum ball exposure, which is a sum of ball exposure and clearance.

\* \* \* \* \*